March 8, 1966 F. P. BURROUGHS 3,238,745
TORSIONAL SHOCK ABSORBING COUPLING WITH INTERCHANGEABLE CORES
Filed May 22, 1964

INVENTOR.
FRANKLIN P. BURROUGHS
BY
Imirie and Smiley
ATTORNEYS

United States Patent Office 3,238,745
Patented Mar. 8, 1966

3,238,745
TORSIONAL SHOCK ABSORBING COUPLING WITH INTERCHANGEABLE CORES
Franklin P. Burroughs, Kensington, Md., assignor to Cable Isolation Systems, Inc., New York, N.Y., a corporation of New York
Filed May 22, 1964, Ser. No. 369,508
7 Claims. (Cl. 64—12)

The present invention relates to a torsional shock absorbing coupling with interchangeable cores and is an improvement on the resilient coupling described and claimed in my copending application, Serial No. 297,720 filed July 25, 1963.

In said copending application is fully described an anti-vibration coupling constituted by at least two sections of cable, placed so as to form an angle between them, but lying in two adjacent parallel planes and having a seat in corresponding bores provided in a common block. Said cables are firmly fastened together at their crossing points by deforming the walls of the block or by forcing two plugs through openings in the block against the cables at their crossing point. The ends of the cable sections which protrude from the block are encased in sleeves and made fast thereto by compressing an annular zone of each sleeve. When the sleeves, as pairs attached to each cable section, are secured to shafts for coupled turning, the vibrations or shocks of discontinuities of the rotational motion, whether the shafts are axially aligned or not, are absorbed in the cable sleeves or between each sleeve and the metallic block at the fasten crossing point of the cable sections. The absorption of vibrations and shocks in the cables is enabled by a combination of bending flexibility, resilience and torsional twisting of the cable wires or filaments between the anchoring points and the sleeves at the cable end.

The present invention provides a coupling having exactly the above described characteristics but provided with improvements whereby a plurality of the described couplings, or crossed cables, herein termed cores, are readily interchangeable and replaceable in the yoke arms of hubs to which they are fastened, the hubs in turn remaining fixed to the coupled shafts. Thus, the interchangeable cores may be constituted by cable pairs of different size or diameter, the cable ends being removably clamped to the yoke arms which are integral with the hubs.

The necessity for providing an improved coupling having interchangeable cores arises out of the frequent requirement to provide for different torques to be transmitted, or shocks to be absorbed, by the shafts of the coupled machines. Also on occasion, a coupling may fail and require replacement, and it is frequently desirable to use an undersized coupling as a safety overload protector, in which case the coupling is meant to fail in order to protect the machine. In addition, there are many installations where the coupled machines are very closely spaced and it is impractical to move the machines so that if a replacement coupling, or a coupling core of different torsional characteristics is needed, the replacement coupling must be capable of ready insertion without moving the yokes on the shafts, or the machines themselves.

Accordingly, it is a primary object of the present invention to provide a torsional, shock absorbing coupling having readily interchangeable cores of different torsional characteristics whereby loads and shocks of different values may be accommodated.

It is another important object of the present invention to provide a resilient coupling of the above described characteristics in which different cores may be interchanged without moving the coupled machines, their shafts or the hub portions of the coupling.

A further object of the invention is to provide a resilient coupling of the above described characteristics in which the interchangeable cores are fastened to hubs having yoke arms by means of readily accessible and removable fastening members penetrating openings in said yoke arms.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Figure 1:
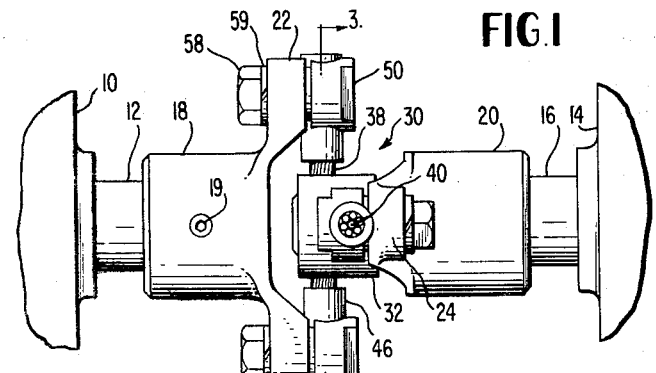
FIG. 1 is an elevation of a coupling according to the invention connecting the shafts of two closely spaced machines.
Figure 2:
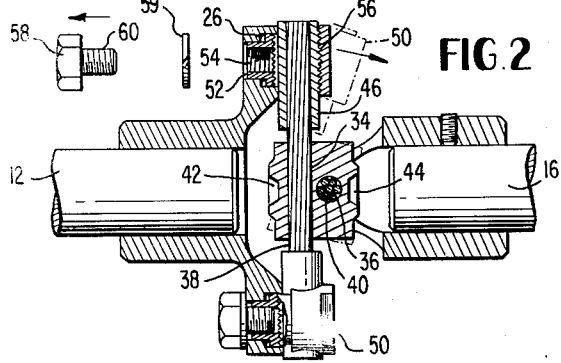
FIG. 2 is a longitudinal section, partly in elevation, through the coupling of FIG. 1.

Referring now more particularly to the drawings, FIGS. 1 and 2, illustrate a prime mover 10 having a drive shaft 12 aligned with and coupled to a driven shaft 16 of another and relatively closely spaced machine 14. The prime mover may be any rotary power device such as an electric motor, gasoline engine, a steam turbine, water wheel, or the like. The driven machine 14 may be a reduction gear, a generator, a pump, compressor, grinder or the like. The coupling connecting the shafts 12 and 16 comprises a pair of hubs 18 and 20 which are fixed to the respective shafts in any conventional manner, for example, by splines and set screws 19, or by welding, wedging, or any other suitable means. The hubs 18 and 20 each have a pair of radially extending yoke arms, 22 and 24 respectively, each arm being provided with a shouldered through opening 26 for receiving a fastening means to be described.

A shock absorbent resilient core generally indicated by the reference numberal 30 is placed between the hubs 18 and 20 and fastened to the yoke arms 22 and 24. The core comprises a cylinder 32, preferably of metal but which can be made of other material, and having adjacent straight and crossing channels 34 and 36. In each channel is housed a straight section of wire cable 38 and 40, respectively. The wire cables preferably comprise twisted strands of filaments, or wires of metal which are anchored to each other and to the cylinder or block 32 by compressing the block at opposed points 42 and 44 sufficiently to deform the block and the cables at their crossing point and thus securely anchor or fasten the cables together centrally of the block. If desired, a plug or other suitable means may be inserted in openings in the block to fasten the cables and the block together. The protruding outer ends of each cable are surrounded for part of their length by sleeves 46 shrunk or pressed on, or otherwise secured, to the cable. Sleeves 46 are preferably, although not necessarily formed, of a relatively soft metal such as copper.

For removably fastening the core 30 to each yoke arm 22, 24 there is provided a bolt 50 having a short stud 52 whose length is slightly less and no greater than the thickness of the yoke arm. A threaded bore 54 is provided axially of stud 52 and another opening 56 is provided through the head of the bolt 50 and transverse to the opening 54. Desirably, opening 56 is larger in diameter than the sleeve 46 and is provided with teeth, or threads, for gripping the sleeve 46. Mating with the bolt 50 is a nut 58 having an externally threaded shank 60 also of short length and approximately equal in length to that no greater than the thickness of the yoke arm. When a sleeve 46 at the end of the cable 38 is inserted in the opening 56 of the bolt 50 and the stud 52 inserted into opening 26 in the yoke arm the shank 60 of nut 58 may be inserted from the opposite direction through the opening 26 and into the threaded bore 54 of the bolt. Desirably a lock washer 59 surrounds the shank of the nut. Upon tightening the nut 58, the bolt 50 is pulled tightly into the opening 26 of the yoke arm so that the sleeve 46 is clamped tightly between the wall of the opening 56 and the yoke arm, the teeth at one side of the opening 56 penetrating the surface of the sleeve and gripping the same tightly. Each of the four cable ends of the cables 38, 30 are thus removably fastened to the yoke arms 22 and 24. Each cable may be twisted in the same or opposite directions before fastening the sleeved cable end to the yoke arm so that the cable will be prestressed torsionally to meet a particular usage. The lengths of the cable portions protruding from the common block and the spacing between the block and sleeves are chosen and calculated according to the antivibrational functions encountered as well as to the relevant torques.

It is apparent from the above that a coupling 30 such as described and illustrated in FIGS. 1 and 2 will transmit the rotation of shaft 12 to shaft 16 through the inherent rigidity of the two cable sections 38 and 40 which being desirably but not necessarily perpendicular to each other permit a more or less universal connection between the two shafts. The swiveling of each shaft about the axis of its cable section is opposed by the torsional storing force within the cable which returns the shaft to its initial condition when the swiveling force is removed. The greater the swiveling the greater the opposition, not only by the torsion between the anchoring point and sleeve in each cable but by the increased friction between the cable filaments, or wires, as they twist with respect to each other. Thus, the torsion within the cables provides an adsorption of vibrational shocks which together with the resiliency and flexibility in the cable sections serve to oppose and dampen oscillations, shocks and vibrations.

If as assumed in the illustration of FIGS. 1 and 2, that the machines 10 and 14 are solidly affixed to a base and so close together as to provide little more space than that occupied by the coupling and the coupling has deliberately been chosen of such size as to fail should the shock and vibration or torque become too great, then one coupling core 30 may be quickly and readily removed and another one substituted by loosening the nut 58 or bolt 50. Because of the shortness of the stud 52 and shank 60 and the flexibility of the cables 38 and 40 between the block 32 and the sleeves 46, the cable will bend sufficiently to permit the bolt 50 to be removed from the opening 26 of the yoke arm, see broken lines and arrows, FIG. 2. When each of the four nuts has thus been removed the core 30 may be moved away from the hubs 18 and 16 in a direction lateral to the shafts and a new core 30 substituted and fastened to the yoke arms by the same bolts and nuts, 50 and 58. This replacement can be made without shifting the hubs 18 or 20 along the respective axles 12 and 16, or removing the hubs, or moving the machines 10 and 14.

Figure 4:
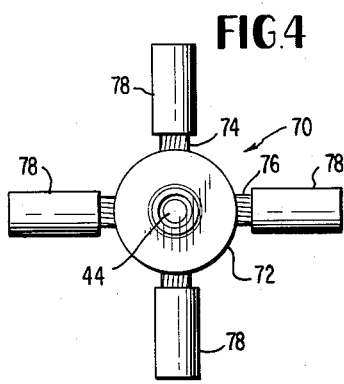
FIGS. 4 and 5 are elevational views of a plurality of interchangeable coupling cores which may be substituted for the core illustrated in FIGS. 1-3.
Figure 5:
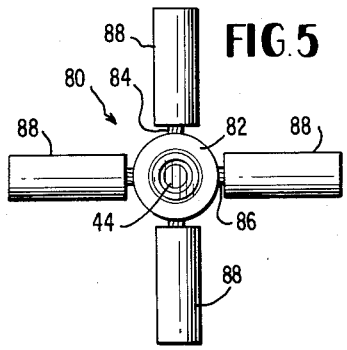

Cores 70 and 80 are illustrated in FIGS. 4 and 5 which are similar and interchangeable with core 30 but of larger and smaller size and adapted to transfer larger and smaller torques and absorb larger and smaller shocks, or vibration. The core 70 comprises a somewhat larger diameter and thicker cylinder 72 having the cross cables 74 and 76 anchored therein at their crossing point, said cables being of larger diameter than the cables of 38 and 40, respectively. The cable ends are surrounded by sleeves 78 fastened thereto whose outer ends, however, are spaced from the cable anchor point a distance equal to that of the outer ends of the sleeves 46 in core 30. Thus the larger core is adapted to be received and clamped in the same yoke arms 22 and 24 by passing the bolt 50 and nut 58 through the arm openings 26 in the manner as previously described for core 30. Obviously, the larger diameter cable 74, having the slightly longer flexible portions intermediate the block 72 and sleeves 78, is capable of transmitting a greater torque and absorbing greater shock. Core 70 also may be readily removed by unclamping bolt 50 and nut 58 in the manner as previously described for core 30 for replacement by another core 70 or by a core of smaller size such as core 80 in FIG. 5.

Core 80 comprises a cylinder 82 of smaller diameter than cylinder 32 in which crossing cables 84 and 86 are anchored. The ends of the cables are fastened to the sleeves 88 whose outer ends are the same distance from the cable anchoring point as the sleeves 46 and 78. The nominal diameters of all of the sleeves are equal so that all can be inserted through and clamped by the walls of the openings 56 in the bolts 50. It will be apparent that the ready replacement of the larger cores 30 or 70 by the smaller core 80 enables the transmission of smaller torque between the same two machines and provides an overload safety feature whereby if too great a torque is transmitted or too great a shock between the driving and driven shafts the core 80 will fail, in which event another core 80 may be readily substituted therefor.

Figure 6:
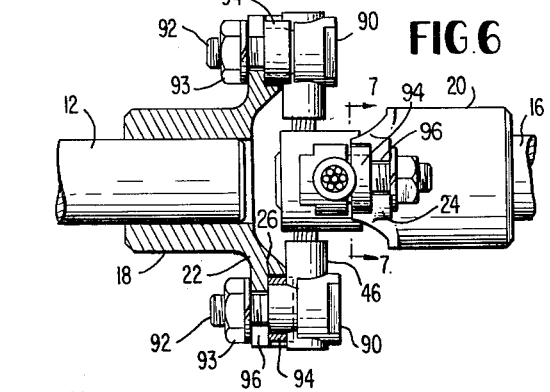
FIG. 6 is an elevational view similar to FIG. 1 of another embodiment of the invention.
Figure 7:
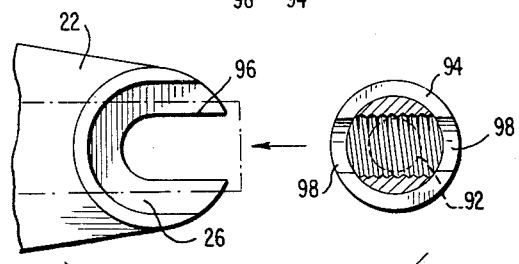
FIG. 7 is an enlarged section view exploded taken along line 7—7 of FIG. 6.
Figure 3:
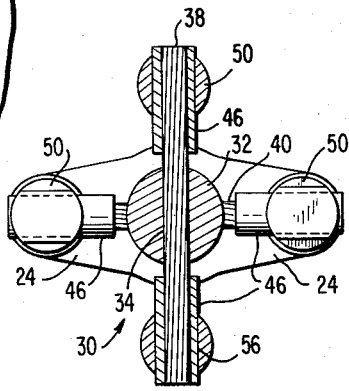
FIG. 3 is a section taken on line 3—3 of FIG. 1 and looking in the direction of the arrows.

FIG. 6 illustrates another embodiment of the coupling in which the yoke arm and fastening means are slightly modified. In each yoke arm 22, 24 the shouldered opening 26 is connected to the peripheral edge of the yoke arm by a slot 96 having a width slightly greater than the diameter of the stud 92 or the bolt 90, which is substituted for the bolt 50 and nut 58. Bolt stud 92 if of considerable length and passes through and beyond the opening 26 and is threaded on its exterior for reception of the nut 93. A washer 94 having diametrically opposed saddle grooves 98 is seated on the shoulder of opening 26. The bolt 90 thus clamps the cable sleeve against the two saddles 98 of washer 94. In all other respects the hubs, yoke arms and cores are similar to the embodiment described in FIGS. 1–3. Should it be desired to remove and replace the core 30 with another or different sized core the nut 93 is loosened on the shank 92 of bolt 90. The washer 94 is then free to move laterally from the enlarged portion of opening 26 above the shoulder therein. The bolt 90, washer 94 and loosened nut 93 may then be pulled radially away from the yoke arm 22 or 24, the bolt stud 92 passing through the slot 96. When all four fastening bolts have been removed from the yoke arms the core 30 may be easily removed laterally of the drive shafts 12 and another core inserted between the yoke arms whereupon the bolts 90 and related parts may be replaced and tightened to clamp the sleeves and cables to the yoke arms. In this modification there is no need for flexing the cable ends to remove the fastening bolts and no axial movement of the bolts and nuts is necessary other than that involved in slightly loosening the nuts.

The described interchangeable cores and fastening means may obviously be fastened, unfastened and replaced regardless of whether the shafts 12 and 16 are exactly in alignment or at an angle to each other. In the latter instance, it is slightly easier to remove the fastening nut at the yoke arm whose cable end is at an outwardly directed angle, and the coupling may then be turned 90° steps to unfasten each such cable end sequentially.

It should be readily apparent also that the provision of different sized cores, such as 30, 70 and 80, for hubs 18 and 20 of one size provides a standard line of couplings utilizing a single size hub with a variety of cores of different application. Obviously, however, the hubs may also be of different size so that both the hub and the cores may be applicable to different usages, the different sized cores being nevertheless replaceable in their corresponding hubs as long as the yoke arms 22, 24 are of uniform dimension. Desirably, the yoke arms spread a sufficient distance laterally of the bores of the hubs to provide ample space around the fastening bolts and nuts to permit the application of automatic means for tightening and loosing these parts.

It is again emphasized that the availability of couplings having interchangeable cores of different size which are readily replaceable without shifting or moving the yokes, or integral hubs, is of great advantage in applications where space is limited, where the driven machine is adapted to perform different functions involving varying loads and varying vibration and shock, and where it is desirable at least at times to provide a small resilient core which will fail upon an overload to protect and safeguard the machine.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. Resilient coupling for transmitting torques and/or twisting forces while absorbing vibrations and shocks, comprising a pair of hubs adapted to be fixed to shafts to be coupled for rotation together, each of said hubs having a yoke with radial arms, and a removable and replaceable core connected to said yokes for transmitting torques, said core including at least a pair of cables disposed at an angle to each other within channels in a common block and made fast to the block in anchoring points, each of the ends of said cables protruding from the block and being clamped within a collar, the cables and block of said core being of predetermined dimensions for transmitting torque and absorbing vibration of a selected value, and said collars for each cable being of uniform external diameter, each said yoke arm having an opening therethrough whose axis is parallel to the bore of its hub, a fastening member passing through each opening and having a head, the head of each member having an opening intersecting its inner face transverse to the member and receiving the collar at one end of one cable pair, and a fastening element removably engaged with said member to engage said yoke arm to force the arm into tight but removable clamping engagement with the collar on the cable, whereby on removal of said core one of a plurality of interchangeable cores having different sized cables and blocks may be connected to said yoke arms for transmitting torques of relatively different values.

2. A coupling comprising a pair of hubs adapted to be fixed to shafts to be coupled for rotation together, each of said hubs having an integral yoke with radially disposed arms, an interchangeable core for transmitting torque connectable to said yoke arms, said core including at least a pair of cables disposed at an angle to each other within channels in a common block and made fast to one another in a single anchoring point, the ends of said cables protruding from the block and being removably connected to said yoke arms, each yoke arm being provided with an opening therethrough having an axis parallel to the bore of its hub, a fastening member having a head with a stud inserted in each said opening, the head of each fastening member having an opening intersecting its inner face transverse to its stud and receiving the end of one cable of a pair, a fastening element threaded on said fastening member to engage said yoke arm to force the arm and fastening member into tight but removable clamping engagement with the cable end, each said stud being shorter than the thickness of the associated yoke arm and having an axial threaded bore, and said fastening element having a short externally threaded shank which is screwed into the bore of the associated stud for clamping a core cable to a yoke arm, the shortness of said stud and shank and the flexibility of each cable permitting loosening of the bolt and nut and their removal from the yoke arm by slightly bending the cable without shifting or removal of said hubs from the shafts to which they are fixed.

3. A coupling according to claim 2 wherein each protruding cable end is enclosed in and fixed to a metal sleeve.

4. A coupling according to claim 3 wherein said openings in the bolt heads are provided with teeth for biting into and tightly clamping said sleeves.

5. A coupling comprising a pair of hubs adapted to be fixed to shafts to be coupled for rotation together, each of said hubs having an integral yoke with radially disposed arms, an interchangeable core for transmitting torque connectable to said yoke arms, said core including at least a pair of cables disposed at an angle to each other within channels in a common block and made fast to one another in a single anchoring point, the ends of said cables protruding from the block and being removably connected to said yoke arms, each yoke arm being provided with an opening therethrough having an axis parallel to the bore of its hub, a fastening member having a head and a stud inserted in each said opening, the head of each fastening member having an opening intersecting its inner face transverse to the stud and receiving the end of one cable of a pair, a fastening element threaded on said member to engage said yoke arm to force the arm and head of the fastening member into tight but removable clamping engagement with the cable end, each of said openings in the yoke arms being connected by a slot to the periphery of the arm, said slots having a width slightly larger than the diameter of said stud, whereby upon loosening of the associated fastening element the fastening member may be moved through the slot and removed from the yoke arm without shifting or removal of said hubs from the shafts to which they are fixed.

6. A coupling according to claim 5 wherein each of said openings in the yoke arms is shouldered to provide portions of large and small diameters, a washer seated in said large diameter portion and removable from the yoke arm radially through said slot, said washer having diametrically opposed saddle grooves for seating a sleeve of a cable end.

7. A coupling according to claim 5 wherein said slots in said arms extend radially of the associated studs.

References Cited by the Examiner

UNITED STATES PATENTS

| | | | |
|---|---|---|---|
| 1,185,209 | 5/1916 | Lapp | 64—15 |
| 1,659,353 | 2/1928 | Dwyer | 64—12 |
| 1,788,309 | 1/1931 | Landis | 248—66 |
| 2,088,481 | 7/1937 | Mylius | 24—125 X |
| 2,525,580 | 10/1950 | Beler | 64—6 X |

FOREIGN PATENTS 533,395 9/1931 Germany.

MILTON KAUFMAN, *Primary Examiner.*

H. C. COE, *Examiner.*